United States Patent
Zhang et al.

(10) Patent No.: US 11,593,355 B2
(45) Date of Patent: Feb. 28, 2023

(54) METHOD, DEVICE AND COMPUTER PROGRAM PRODUCT FOR PROCESSING METADATA

(71) Applicant: EMC IP Holding Company LLC, Hopkinton, MA (US)

(72) Inventors: Ming Zhang, Beijing (CN); Shuo Lv, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 103 days.

(21) Appl. No.: 16/998,318

(22) Filed: Aug. 20, 2020

(65) Prior Publication Data
US 2021/0216532 A1 Jul. 15, 2021

(30) Foreign Application Priority Data
Jan. 14, 2020 (CN) .......................... 202010037217.5

(51) Int. Cl.
*G06F 16/23* (2019.01)
(52) U.S. Cl.
CPC ...... *G06F 16/2379* (2019.01); *G06F 16/2358* (2019.01)
(58) Field of Classification Search
CPC .......................... G06F 16/1237; G06F 16/2358
See application file for complete search history.

(56) References Cited

U.S. PATENT DOCUMENTS

| | | | |
|---|---|---|---|
| 8,756,194 B1* | 6/2014 | Merrells | G06F 16/178 707/634 |
| 10,585,746 B2 | 3/2020 | Shilane et al. | |
| 10,664,165 B1 | 5/2020 | Faibish et al. | |
| 10,761,765 B2 | 9/2020 | Duggal et al. | |
| 11,010,240 B2 | 5/2021 | Shilane et al. | |
| 11,327,799 B2 | 5/2022 | Karmarkar et al. | |
| 11,349,915 B2 | 5/2022 | Xu et al. | |
| 2018/0173720 A1* | 6/2018 | Lord | G06F 16/1815 |

* cited by examiner

*Primary Examiner* — Tamara T Kyle
*Assistant Examiner* — Lahcen Ennaji
(74) *Attorney, Agent, or Firm* — BainwoodHuang

(57) ABSTRACT

Techniques to process metadata involve: in response to receiving a modification transaction for metadata on a computing device, acquiring information related to a busyness degree of the computing device; and according to at least a determination that the busyness degree is greater than a threshold degree, modifying the metadata in a metadata storage apparatus of the computing device directly without generating a log related to the modification transaction in a log storage apparatus of the computing device. Accordingly, such techniques can achieve good processing performance irrespective of a busy state or non-busy state of a computing device. In particular, when the computing device is in a busy state, a newly triggered modification transaction can still be timely executed, thereby improving IOPS performance of the computing device in a busy state.

20 Claims, 4 Drawing Sheets

METHOD, DEVICE AND COMPUTER PROGRAM PRODUCT FOR PROCESSING METADATA

CROSS-REFERENCE TO RELATED APPLICATION

This application claims priority to Chinese Patent Application No. CN202010037217.5, on file at the China National Intellectual Property Administration (CNIPA), having a filing date of Jan. 14, 2020, and having "METHOD, DEVICE AND COMPUTER PROGRAM PRODUCT FOR PROCESSING METADATA" as a title, the contents and teachings of which are herein incorporated by reference in their entirety.

FIELD

Embodiments of the present disclosure generally relate to storage technologies, and more specifically, to a method, electronic device and computer program product for processing metadata.

BACKGROUND

In a legacy data storage system, data are divided into actual data and metadata. The actual data refers to real data (such as, documents, audios, videos, pictures, and the like) stored by users. The metadata refers to data for describing characteristics of actual data, such as access right, the owner of the actual data, distribution information of actual data blocks, and the like. There are a large number of operations for metadata including creating, deleting, updating/modifying metadata, and the like. The busyness degree of the computing device varies with the different tasks being executed. In particular when the computing device is in a busy state, the legacy metadata processing solution cannot achieve good processing performance. Therefore, it is desirable for an efficient and reliable mechanism for implementing maintenance of metadata.

SUMMARY

Embodiments of the present disclosure provide a solution for processing metadata.

In a first aspect of the present disclosure, there is provided a method of processing data. The method includes: in response to receiving a modification transaction for metadata on a computing device, acquiring information related to busy degree of the computing device; and according to at least a determination that a busyness degree is greater than a threshold degree, modifying the metadata in a metadata storage apparatus of the computing device directly without generating a log related to the modification transaction in a log storage apparatus of the computing device.

In a second aspect of the present disclosure, there is provided an electronic device. The electronic device includes a processor; and memory coupled to the processor and having instructions stored therein, the instructions when executed by the processor causing the device to perform acts including: in response to receiving a modification transaction for metadata on a computing device, acquiring information related to busyness of the computing device; and according to at least a determination that a busyness degree is greater than a threshold degree, modifying the metadata in a metadata storage apparatus of the computing device directly without generating a log related to the modification transaction in a log storage apparatus of the computing device.

In a third aspect of the present disclosure, there is provided a computer program product. The computer program product is tangibly stored on a computer-readable medium and includes computer-executable instructions. The computer-executable instructions, when executed, cause a device to perform the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent, through the following detailed description of the example embodiments of the present disclosure with reference to the accompanying drawings, where the same reference symbols generally refer to the same elements.

DETAILED DESCRIPTION OF EMBODIMENTS

Figure 1:
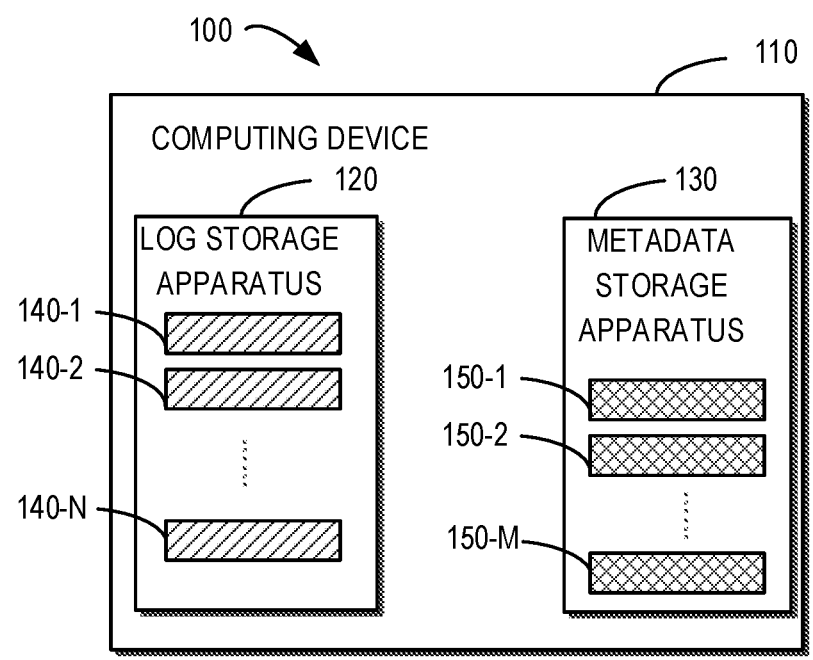
FIG. 1 illustrates a schematic diagram of a storage system in which some embodiments of the present disclosure can be implemented therein.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the terms "include" and "comprise" and their variants are to be read as open-ended terms that mean "include, but is not limited to" and "comprise, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

As used herein, the term "transaction" refers to an atomic unit for executing a task in a storage system (such as, a file system, and the like.) The transaction is executed successfully or unsuccessfully as a whole when performing a task. The "modification transaction" is typically associated with an operation (e.g., an operation of creating, modifying, deleting, copying, cutting, pasting for a file in a file system, or the like) for data (i.e., a file) in a system.

As used herein, the term "metadata storage apparatus" refers to an apparatus for storing metadata in a storage system (such as a file system and the like), including, but not limited to, a memory/cache, a magnetic disk, a hard disk, a storage unit, and the like.

As used herein, the term "log storage apparatus" refers to an apparatus for storing logs related to the modification transactions for metadata in a storage system (such as a file system and the like).

In the legacy technology, in order to ensure that the system is running efficiently, in addition to storing the metadata in a magnetic disk, the computing device also stores some of the metadata in memory/cache (typically in the form of metadata mirror). As a result, the operation of modifying metadata includes modifying respective storage areas in the memory/cache and the magnetic disk. In addition, operations on the metadata are time-sensitive operations. Modification transactions for the metadata should be executed sequentially in chronological order of metadata modification events, so as to ensure accuracy of metadata modification.

In the legacy solution, processing metadata (such as, modifying metadata, and the like) is typically implemented assisted by a log related to the modification transaction. However, the legacy solution relies heavily on log creation, which makes it impossible for the newly triggered modification transaction to be implemented when the computing device is in a busy state (in particular when the storage space of the log storage apparatus is not sufficient), resulting in poor execution performance of the computing device.

According to embodiments of the present disclosure, there is provided an improved solution for processing metadata. According to the present disclosure, the computing device modifies metadata in a metadata storage apparatus directly when the computing device is in a busy state. Therefore, the IOPS of the computing device in the busy state is improved. Meanwhile, the computing device processes the metadata assisted by a log related to a modification transaction to achieve fast input and output response when the computing device is in a non-busy state. In this way, irrespective of the busy state or non-busy state (in particular, the busy state), the computing device can execute the newly triggered modification transaction for the metadata in time, thereby improving the IOPS performance of the computing device.

FIG. 1 illustrates a schematic diagram of a storage system 100 in which embodiments of the present disclosure can be implemented therein. The example data storage system 100 includes a computing device 110. The computing device 110, as a core processing device of the data storage system 100, is used to perform various logical operations in the storage system 100.

The computing device 110 includes a log storage apparatus 120. The log storage apparatus 120 is used to store logs 140-1, 140-2 . . . 140-N (hereinafter referred to as log 140 collectively) of modification transactions for metadata, where N is a number of the generated logs. According to some example embodiments of the present disclosure, the log storage apparatus 120 is a storage apparatus of a type whose contents in the storage apparatus are not lost upon power off.

The computing device 110 further includes a metadata storage apparatus 130 for storing metadata 150-1, 150-2 . . . 150-M (hereinafter referred to as metadata 150 collectively) of the computing device 110, where M is a number of the stored metadata. According to some example embodiments of the present disclosure, the metadata storage apparatus 130 may include at least two storage apparatuses which are independent of each other, for example, a memory/cache and a magnetic disk. The memory/cache is used to store mirrors of part of the metadata 150 to enable a rapid access to and processing of the metadata 150 when the computing device 110 is running. The magnetic disk is provided for storing all metadata 150. Some examples of the magnetic disk include, but are not limited to, a State Solid Disk (SSD), Hard Disk Drive (HDD), Serial Advanced Technology Attachment (SATA) disk, Serial Attached (SA) Small Computer System Interface (SCSI) disk (i.e., SAS disk), and the like.

It should be appreciated that, although FIG. 1 shows a specific number of computing devices 110, log storage apparatuses 120 and metadata storage apparatuses 130, a specific number of logs 140 stored in the log storage apparatus 120, and a specific number of metadata 150 stored in the metadata storage apparatus 130, some other example embodiments may include different numbers of computing devices, log storage apparatuses, metadata storage apparatuses, logs and metadata. The scope of the present disclosure is not limited in respect to this aspect.

Furthermore, it should be appreciated that the arrangement between the computing device 110 and the log storage apparatus 120 and the metadata storage apparatus 130 is not limited to the specific example as shown in FIG. 1. In some other example embodiments, the log storage apparatus 120 may be arranged outside the computing device 110, or even in the metadata storage apparatus 130. Alternatively or in addition, the log storage apparatus 120 may be a remote storage device, cloud storage device, or the like. The scope of the present disclosure is not limited in respect to this aspect. The metadata storage apparatus 130 may include a plurality of storage apparatuses of a plurality of types which may be arranged, in part or all, inside or outside the computing device 110, or may even be remote storage devices, cloud storage devices or the like. The scope of the present disclosure is not limited in respect to this aspect.

In addition, it should be appreciated that the connection relationships between the computing device 110 and the log storage apparatus 120 and the metadata storage apparatus 130 may be in various forms, for example, wired, wireless, through the Internet, or the like.

As discussed above, the metadata storage apparatus 130 may include two types of storage apparatuses, for example, memory/cache and a magnetic disk.

The inventors have noticed that a possible solution for processing metadata 150 (such as, modifying metadata 150) includes: generating a log 140 related to a modification transaction in the log storage apparatus 120 of the computing device 110 firstly, and then modifying, the metadata 150 stored in the metadata storage apparatus 130 (i.e., memory/cache and a magnetic disk) of the computing device 110 (i.e., updating storage areas corresponding to the metadata 150 in the metadata storage apparatus 130). For example, after receiving a modification transaction for the metadata 150, the host (such as, CPU) of the computing device 110 generates a log 140 related to the modification transaction in the log storage apparatus 120 of the computing device 110. The log 140 briefly records information about a metadata modification operation corresponding to the modification transaction. In addition, a mapping relationship may be established between the log storage apparatus 120 and the magnetic disk of the computing device 110, such that the corresponding data in the magnetic disk can be updated later only if the modification transaction of the metadata is recorded in the log storage apparatus 120. Thereafter, the computing device 110 updates the metadata 150 in the memory/cache, and then records the updated metadata 150 in a dirty buffer. The data in the dirty buffer is written into the magnetic disk by a backend program to complete the modification for the metadata 150.

During the above procedure, an operation of returning a response to the host may be performed immediately after generating the log 140 related to the modification transaction or updating the metadata 150 in the memory/cache. The solution has the advantage of greatly shortening time required for returning the response to the host because the operation of modifying the metadata 150 in the magnetic disk is not actually performed when returning a response to the host, thereby improving Input/Output Operations Per Second (IOPS) of the computing device 110.

The inventors have further noticed that the number of modification transactions for the metadata 150 will be increased dramatically when the computing device 110 is in a busy state. As the capacity of the log storage apparatus 120 of the computing device 110 is limited, the storage space of the log storage apparatus 120 of the computing device 110 is severely shortened when the computing device 110 is in a busy state. At this point, if a new modification transaction for the metadata 150 is triggered, the modification transaction newly triggered cannot be performed immediately due to lacking available storage space in the log storage apparatus 120. The computing device 110 cannot perform the newly triggered modification transaction until the preceding modification transactions are completed and the computing device 110 removes the corresponding logs 140 stored in the log storage apparatus 120. Consequently, the solution results in poor execution performance when the computing device is in a busy state.

Moreover, the inventors have further noticed another possible solution for processing metadata 150 (e.g., modifying metadata 150) that includes: modifying metadata 150 in the metadata storage apparatus 130 (i.e., the memory/cache and the magnetic disk) of the computing device 110 directly without generating a log 140 related to a modification transaction in the log storage apparatus 120 of the computing device 110. For example, after receiving a metadata modification transaction, the host of the computing device 110 updates the metadata 150 in the memory/cache and then updates the metadata 150 in the magnetic disk.

During the above procedure, the operation of returning a response to the host cannot be performed until the operation of updating the metadata in the magnetic disk has been completed. Therefore, it takes a relatively long time for returning a response to the host. In the meantime, the inventors have also noticed that since there is no need for the computing device 110 to generate a log 140 related to the modification transaction in the log storage apparatus 120, the newly triggered metadata modification transaction can be performed immediately even if the computing device 110 is in a busy state or there is no available storage space in the log storage apparatus.

In light of the respective advantages and disadvantages of the above two possible solutions, the inventors propose the solution of the present disclosure. Hereinafter, reference will be made to the drawings to describe the embodiments of the present disclosure.

Figure 2:
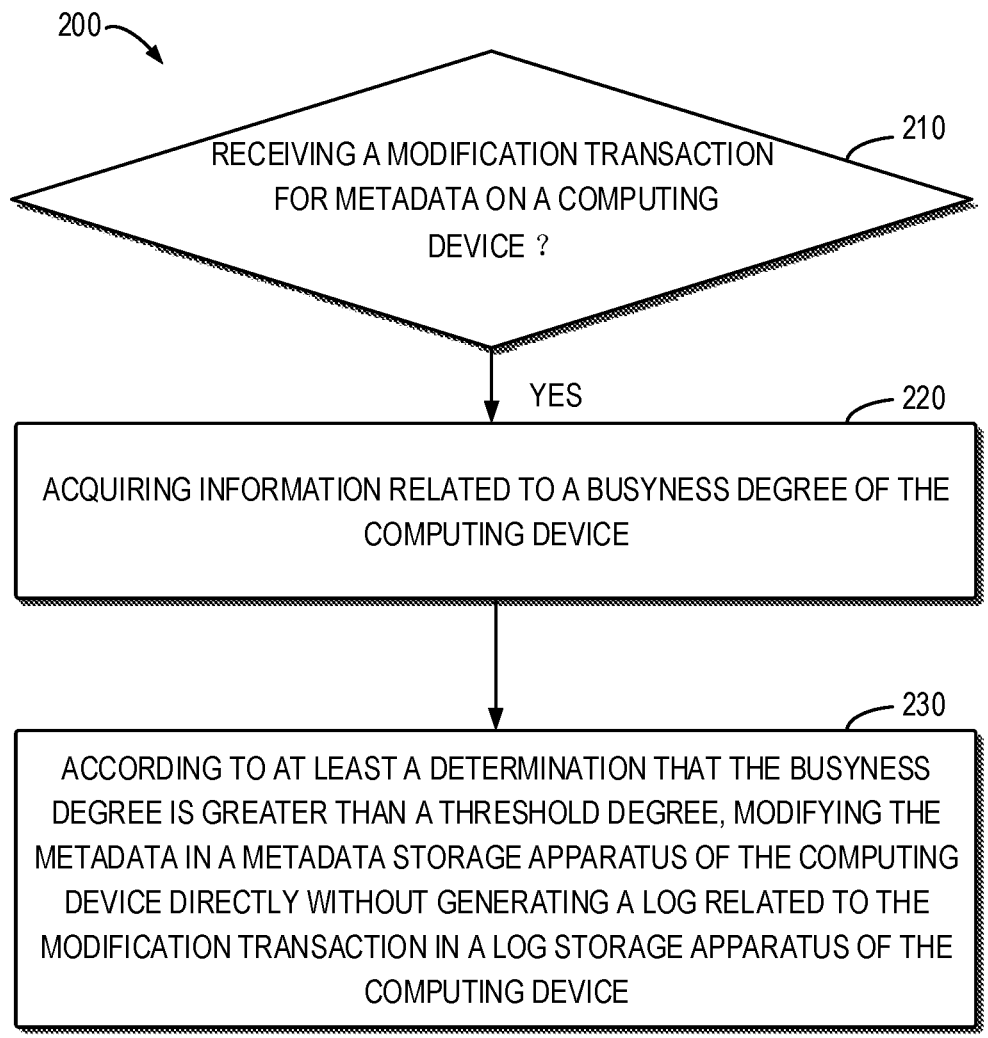
FIG. 2 illustrates a flowchart of a process of processing metadata according to some embodiments of the present disclosure.

FIG. 2 illustrates a flowchart of a process 200 of processing metadata 150 according to some embodiments of the present disclosure. The process 200 may be implemented by the computing device 110 in FIG. 1. For ease of illustration, the process 200 will be described with reference to FIG. 1.

At block 210, the computing device 110 determines whether to receive a modification transaction for the metadata 150 on the computing device 110 or not. The modification transaction may be triggered by a plurality of operations, for example, including but not limited to, operations (such as creation, modification, deletion, copy, paste, cut, and the like) for a file/folder on the computing device 110.

At block 220, the computing device 110 acquires information related to its busyness degree in response to receiving a modification transaction for the metadata 150 on the computing device.

According to some embodiments of the present disclosure, the information related to the busyness degree of the computing device 110 may be information related to an occupancy state of storage resources of the log storage apparatus 120. It should be appreciated that, the information indicating the busyness degree of the computing device 110 may be represented in multiple forms, such as a usage percentage of storage resources of the log storage apparatus 120, an amount of the remaining available storage resources of the log storage apparatus 120, or any other information that may indicate the usage state of storage resources of the log storage apparatus 120.

Since the information on the usage state of the storage resources of the log storage apparatus 120 is directly associated with whether a log 140 of the modification transaction can be generated immediately, the computing device 110 can more reasonably determine the manner for performing the modification transaction for the metadata 150 according to the embodiment.

Alternatively or additionally, according to some embodiments of the present disclosure, the information related to the busyness degree of the computing device 110 may be information that indicates the usage state of computing resources of the Central Processing Unit (CPU) or host of the computing device 110. It should be appreciated that, the information related to the busyness degree of the computing device 110 may be represented in multiple forms, for example, a usage percentage of computing resources of the CPU or host, an amount of remaining available computing resources of the CPU or host, or any other information that may indicate usage state of the computing resources of the CPU or host.

Alternatively or additionally, according to some other embodiments of the present disclosure, the information related to the busyness degree of the computing device 110 may also be an IOPS value of the computing device 110, or the like. The scope of the present disclosure is not limited with respect to this aspect. It should be appreciated that, in other example embodiments, the information related to the busyness degree may be a combination of multiple parameters.

At block 230, when determining the busyness degree is greater than a threshold degree, the computing device 110 modifies the metadata 150 in the metadata storage apparatus 130 of the computing device 110 directly without generating a log 140 related to the modification transaction in the log storage apparatus 120 in the computing device 110.

It should be appreciated that, since the information related to the busyness degree of the computing device 110 may be represented in multiple forms, the threshold degree may be represented in multiple forms accordingly. It is to be understood that the threshold degree may be preset by an administrator of the storage system 100, or may be generated dynamically by the computing device 110 based on historical data. The manner of setting the threshold degree is not limited here.

According to some example embodiments of the present disclosure, the computing device 110 modifying the metadata 150 in the metadata storage apparatus 130 directly may include: the computing device 110 modifies a storage space corresponding to the metadata 150 (i.e., a mirror of the metadata 150) in the memory/cache first, and then modifies a storage space corresponding to the metadata 150 in the magnetic disk.

In addition, after modifying/updating the storage space corresponding to the metadata 150 in the magnetic disk corresponding to the metadata 150 has been completed, the process executing the task (i.e., the modification transaction) returns a response to the computing device 110 (typically, the host of the computing device 110), to indicate that the modification transaction has been completed.

In this way, even in a busy state, the computing device 110 can still timely perform the modification transaction for the metadata 150, thereby improving the IOPS of the computing device 110 in a busy state.

According to some example embodiments of the present disclosure, when determining that the busyness degree is not greater than the threshold degree, the computing device 110 generates a log 140 related to the modification transaction in the log storage apparatus 120, and then modifies the respective metadata 150 in the metadata storage apparatus 130 of the computing device.

An example implementation of performing the above operation by the computing device 110 will be described below. It should be appreciated that the implementation is provided only as an example, which should not be construed as a limitation to the present disclosure.

According to some example embodiments of the present disclosure, the computing device 110 generates a log 140 related to the modification transaction in the log storage apparatus 120 first; and then, the computing device 110 modifies a storage space corresponding to the metadata 150 (i.e., a mirror of the metadata 150) and stores the updated metadata 150 to the dirty buffer. The process for executing the modification transaction may return a response to the computing device 110 (typically, the host of the computing device 110) after generating the log 140 related to the modification transaction or completing updating the metadata 150 in the memory/cache, to indicate to the computing device 110 that the modification transaction has been completed. The metadata stored in the dirty buffer may be written into the magnetic disk via a backend program, to complete modification to the storage space corresponding to the metadata 150 in the magnetic disk.

According to the example embodiment, when the computing device 110 is in a non-busy state, the metadata are processed by generating a log 140 related to the modification transaction, causing a time for returning a response to the host shortened significantly and thus improving the IOPS of the computing device 110 in a non-busy state.

According to the above embodiment of the present disclosure, the computing device 110 acquires information related to its busyness degree when performing the modification transaction for the metadata 150, and performs different operations for the modification transaction based on the acquired busyness degree, which makes that it possible for the computing device 110 to timely perform the modification transaction in any case, thereby improving the IOPS performance of the computing device 110. In particular when the system is in a busy state, the present disclosure can improve the IOPS performance of the computing device 110.

Further, the inventors have noticed that, in some scenarios, a user may perform multiple operations about the same file in the storage system 100 in a short time, which results in a plurality of modification transactions for the same metadata 150 in the storage system 100 within the short period. As discussed above, the modification transactions for the metadata 150 are time-sensitive. Therefore, the computing device 110 has to perform the modification transactions sequentially in chronological order of occurrence of the metadata modification events, to guarantee the accuracy of modification for the metadata 150.

In order to guarantee the accuracy of modification for the metadata, the present disclosure further provides a solution for guaranteeing that the modification transactions are performed sequentially in the chronological order. More specifically, when performing the modification transactions for the metadata 150, the computing device 110 acquires a modification record of the metadata 150, in addition to the information related to its busyness degree. The modification record may indicate whether there is a further modification transaction for the metadata 150 having not been completed. Only when the computing device 110 is in a busy state and there is no further modification transaction having not been completed, the computing device 110 can modify the metadata 150 in the metadata storage apparatus 130 directly without generating a log 140 related to the modification transaction in the log storage apparatus 120 of the computing device 110. In this way, it can be guaranteed that the modification transactions are performed sequentially in chronological order. The solution will be described in detail below.

According to some example embodiments of the present disclosure, when the busyness degree is greater than a threshold degree, the computing device 110 further acquires a modification record of the metadata 150. The modification record may be stored in any storage space accessible to the computing device 110, for example, the memory/cache of the computing device 110.

It should be appreciated that the modification record may be of different representations. A possible representation is 1-bit information for each metadata 150 used to indicate whether there is a further modification transaction for the metadata 150 having not yet been completed yet. Another possible representation is to record a number of other modification transactions for the metadata 150 having not been completed yet. A further possible representation is to generate, for each modification transaction, a modification entry including at least identification information of the metadata 150, such that the computing device 110 can determine, based on the recorded identification information, information on the execution state of the modification transaction for the metadata 150. It should be appreciated that, in other embodiments, the modification record may be recorded in other manners, which is not limited here. In addition, it would be appreciated that the modification record may be recorded in a hash table, linked list, and the like, which is not limited here.

According to some example embodiments of the present disclosure, the execution state may include: being processed/having not been completed, having been completed, and the like. In an alternative embodiment, the execution state may be represented in the form of execution percentage. It should be appreciated that the execution state may be represented in multiple forms, and the scope of the present disclosure is not limited in the aspect.

According to some example embodiments, when determining that the modification record indicates that there is no further modification transaction having not been completed, the computing device 110 modifies the metadata 150 in the metadata storage apparatus 130 directly. More specifically, the computing device 110 modifies the storage space corresponding to the metadata 150 (i.e., a mirror of the metadata 150) in the memory/cache first, and then modifies the storage space corresponding to the metadata 150 in the magnetic disk.

In this way, the modification transactions can still be executed sequentially in chronological order even if the computing device 110 directly modifies the metadata 150 in the metadata storage apparatus 130, thereby guaranteeing the accuracy of processing the metadata 150.

In addition, according to some example embodiments of the present disclosure, when determining that the modification record indicates that there is a further modification transaction having not been completed, the computing device 110 cannot modify the metadata in the metadata storage apparatus 120 directly. At this point, if the computing device 110 is in a busy state (for example, the log storage apparatus 120 does not have available storage space), the computing device 110 has to wait. When the preceding modification transaction has been completed and there is available remaining space in the log storage apparatus 120 after removing the log 140 corresponding to the preceding modification transaction, the modification transaction can be executed. More specifically, the computing device 110 first generates a log 140 related to the modification transaction in the log storage apparatus 120, and then the computing device 110 modifies a storage space corresponding to the metadata 150 (i.e., a mirror of the metadata 150) in the memory/cache. The updated metadata 150 is recorded to the dirty buffer by the corresponding process. After generating the log 140 related to the modification transaction and/or updating the metadata 150 in the memory/cache, the process executing the modification transaction returns a response to the computing device 110 (typically, the host of the computing device 110), to indicate to the computing device 110 that the modification transaction has been completed. The data recorded in the dirty buffer is written into the magnetic disk via a backend program, to complete modifying the storage space corresponding to the metadata 150 in the magnetic disk of the computing device 110.

In this way, when there are other modification transactions that have not been completed yet, the modification transactions are recorded in the log storage apparatus 120 of the computing device 110 in chronological order (when there is available storage space in the storage apparatus 120). As such, it can be guaranteed that the modification transactions for the same metadata 150 can be executed sequentially in the chronological order of occurrence of metadata modification events in any case.

According to some example implementations of the present disclosure, the computing device 110 further performs an operation of maintaining the modification record. More specifically, the computing device 110 determines the execution state of the modification transaction and updates the modification record of the metadata 150 dynamically based on the determined execution state.

Moreover, the inventors have noticed that the problem of delayed execution of the modification transaction is not involved when the computing device 110 directly modifies the metadata 150 in the metadata storage apparatus 130. Therefore, the operation of maintaining the modification record can be performed only when the computing device 110 needs to generate the log 140.

According to some example embodiments of the present disclosure, the computing device 110 may determine that the modification transaction has not been completed after generating the log 140 or completing the operation of updating the metadata 150 in the memory/cache, and may update the modification record based on the determined state of having not been completed. Correspondingly, after completing the operation of updating the metadata 150 in the magnetic disk, the computing device 110 determines that the modification transaction has been completed. Based on the determined state of having been completed, the computing device 110 removes the log 140 corresponding to the modification transaction in the log storage apparatus 120 and executes the operation of updating the modification record.

In this way, the execution state of the modification transaction may be updated dynamically in real time. Therefore, even if the computing device 110 modifies the metadata 150 in the metadata storage apparatus 130 directly, it can still be guaranteed that the modification transactions are executed sequentially in chronological order.

For further illustration of the solution of the present disclosure, reference will be made to FIG. 3 to describe some specific application examples of the present disclosure. It should be appreciated that the specific application examples as described with reference to FIG. 3 are provided merely for illustration, which cannot be construed as limiting the present disclosure.

Figure 3:
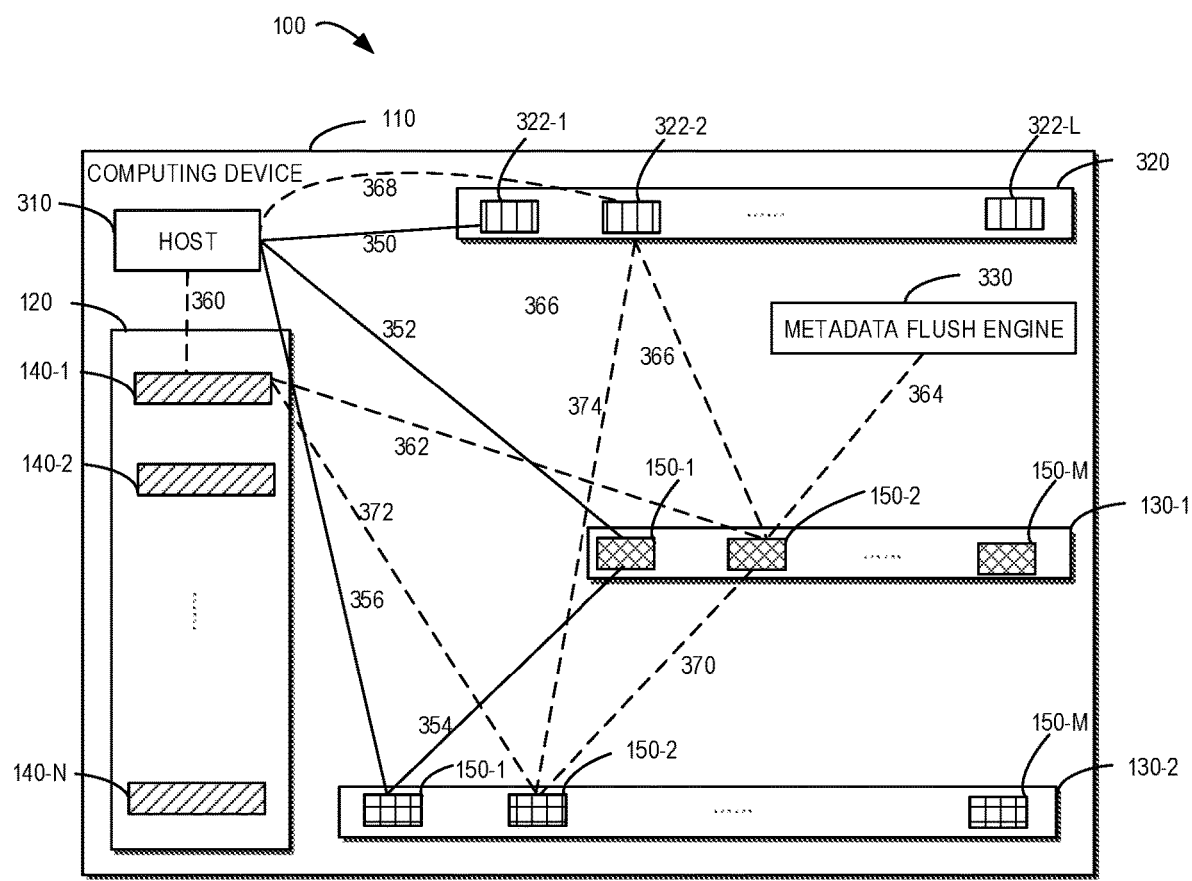
FIG. 3 illustrates a schematic block diagram of a storage system in which some embodiments of the present disclosure can be implemented therein.

FIG. 3 illustrates a schematic diagram of a storage system 100 in which some embodiments of the present disclosure can be implemented. As shown in FIG. 3, the storage system 100 includes a computing device 110 which functions as a core processing device of the storage system to execute various logical operations in the storage system 100. The computing device 110 further includes a host 310, a log storage apparatus 120, a modification record storage apparatus 320, and metadata storage apparatuses 130-1 and 130-2. In this specific embodiment, the metadata storage apparatus 130-1 is memory/cache, and the metadata storage apparatus 130-2 is a magnetic disk. Furthermore, as shown in FIG. 3, the log storage apparatus 120 stores logs 140-1, 140-2 . . . 140-N related to the modification transactions; the metadata storage apparatuses 130-1 and 130-2 store metadata 150-1, 150-2 . . . 150-M; and the modification record storage apparatus 320 stores modification records 322-1, 322-2 . . . 322-L (hereinafter referred to as modification records 322 collectively), where L is a number of modification records. The computing device also includes a metadata flush engine 330 for assisting a flush operation for the metadata 150 in the memory.

It should be appreciated that, although FIG. 3 illustrates a specific number of the computing device 110, log storage apparatus 120, metadata flush engine 330, host 310, modification record storage apparatus 320, and metadata storage apparatus 130, a specific number of logs 140 stored in the log storage apparatus 120, a specific number of metadata 150 stored in the metadata storage apparatus 130, and a specific number of modification records 322 stored in the modification record storage apparatus, some other example embodiments may cover different numbers of computing devices, log storage apparatuses, metadata storage apparatuses, metadata flush engines, hosts, modification record storage apparatuses, logs, modification records, and metadata. The scope of the present disclosure is not limited in the aspect.

It is to be appreciated that the arrangement and the connection relationship of the computing device 110, the log storage apparatus 120, the metadata flush engine 330, the host 310, the modification record storage apparatus 320 and the metadata storage apparatus 130 are not limited to the specific arrangement and connection relationships as shown in FIG. 3. In addition, the above components may be split or combined in other embodiments.

FIG. 3 further shows an operation sequence when the computing device 110 is processing the metadata. It should be appreciated that the specific operation sequence is provided merely as an example, and in other embodiments, the operations may be increased or reduced and the execution sequence of the operations may be altered.

In an example embodiment, the host 310 of the computing device 110 receives a modification transaction for the metadata 150, for example, modifying the metadata 150-1. The host 310 acquires information related to the busyness degree of the computing device 110. In this specific embodiment, the host 310 may acquire information indicating storage resource usage state of the log storage apparatus 120. The computing device 110 determines its own busyness degree based on the acquired information. If the host 310 determines that the busyness degree of the computing device 110 is greater than a threshold degree, the host 310 acquires 350 the modification record 322 from the modification record storage apparatus 320. In the specific embodiment, the modification record 322-1 may be used to indicate the modification record for the metadata 150-1. If the modification record 322-1 indicates that there is no further modification transaction for the metadata 150-1 having not been completed, the host 310 directly modifies 352 the metadata 150-1 in the metadata storage apparatus 130-1 (i.e., memory/cache), and further modifies 354 the metadata 150-1 in the metadata storage apparatus 130-2 (i.e., a magnetic disk.) Subsequently, the corresponding process executing the modification transactions returns 356 a response to the host 310, to indicate that the modification transactions for the metadata 150-1 have been completed.

In another application example, the host 310 of the computing device 110 receives a modification transaction for the metadata 150, for example, modifying the metadata 150-2. The host 310 acquires information related to the busyness degree of the computing device 110. In the specific embodiment, the host 310 may acquire information indicating the storage resource usage state of the log storage apparatus 120, and determines, based on the acquired information, the busy state of the computing device 110. If the host 310 determines that the busyness degree of the computing device 110 is not greater than the threshold degree, the host 310 first generates a log 140 in the log storage apparatus 120. In the specific embodiment, the host 310 generates 360, in the log storage apparatus 120, a log 140-1 for recording the modification transaction for the metadata 150-2. The corresponding process for executing the modification transaction then modifies 362 the metadata 150-2 in the data storage apparatus 130-1 (i.e., memory/cache), and the operation may be implemented with the assistance of the metadata flush engine 330 flushing 364 the metadata 150-2 in the metadata storage apparatus 130-1. At this point, the state of the modification transaction for the metadata 150-2 is determined to be a state of having not been completed, and the corresponding process for executing the modification transaction updates, based on the determined state, the modification record 322 in the modification record storage apparatus 320. In the specific embodiment, the modification record 322-2 is used to indicate the execution state of the modification transaction for the metadata 150-2. The corresponding process for executing the modification transaction updates the modification record 322-2, causing the modification record 322-2 to indicate that there is a further modification transaction for the metadata 150-2 having not been completed. Thereafter, the host 310 receives 368 a response.

The updated metadata 150-2 in the metadata storage apparatus 130-1 is stored in the dirty buffer. The metadata stored in the dirty buffer may be written 370 in the metadata storage apparatus 130-2 (i.e., a magnetic disk) via a backend program, to complete modifying the storage space corresponding to the metadata in the metadata storage apparatus 130-2.

At last, the corresponding process for executing the modification transaction removes 372 the log 140 (i.e., the log 140-1) corresponding to the modification transaction in the log storage apparatus 120, and executes the operation of updating 374 the modification record 322 (i.e., the modification record 322-2.)

Figure 4:
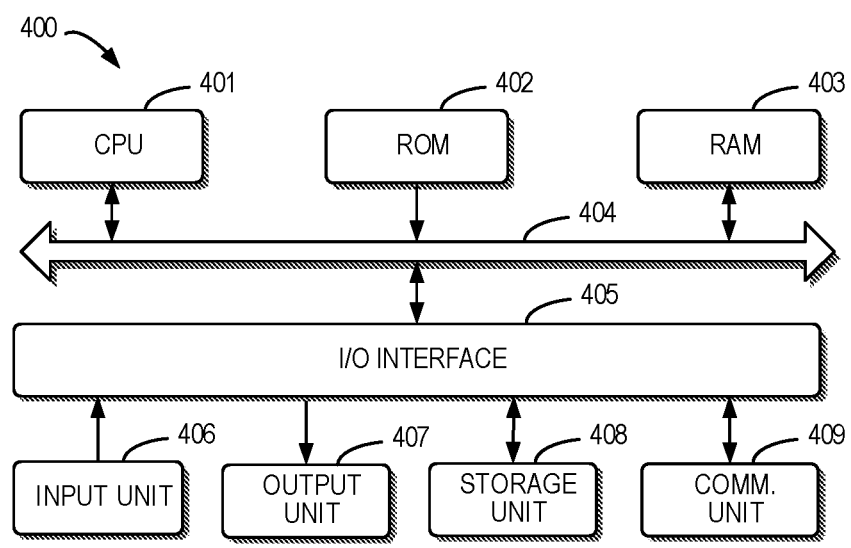
FIG. 4 illustrates a block diagram of an example device that can be used to implement embodiments of the present disclosure.

FIG. 4 illustrates a schematic block diagram of an example device 400 that can be used to implement embodiments of the present disclosure. The device 400 may be implemented as the computing device 110 of FIG. 1. The device 400 may be used to implement the process 200 of FIG. 2.

As shown therein, the device 400 includes a central processing unit (CPU) 401 which performs various appropriate acts and processing, based on computer program instructions stored in a read-only memory (ROM) 402 or computer program instructions loaded from a storage unit 408 to a random access memory (RAM) 403. The RAM 403 stores therein various programs and data required for operations of the device 400. The CPU 401, the ROM 402 and the RAM 403 are connected via a bus 404 with one another. An input/output (I/O) interface 405 is also connected to the bus 404.

The following components in the device 400 are connected to the I/O interface 405: an input unit 406 such as a keyboard, a mouse and the like; an output unit 407 including various kinds of displays and a loudspeaker, etc.; a storage unit 408 including a magnetic disk, an optical disk, and etc.; a communication unit 409 including a network card, a modem, and a wireless communication transceiver, etc. The communication unit 409 allows the device 400 to exchange information/data with other apparatus through a computer network such as the Internet and/or various kinds of telecommunications networks.

Various processes and processing described above, e.g., the process 200, may be executed by the processing unit 401. For example, in some embodiments, the process 200 may be implemented as a computer software program or computer program product that is tangibly included in a machine-readable medium, e.g., a non-transient computer-readable medium, such as the storage unit 408. In some embodiments, part or all of the computer programs may be loaded and/or mounted onto the device 400 via ROM 402 and/or communication unit 409. When the computer program is loaded to the RAM 403 and executed by the CPU 401, one or more steps of the method 200 as described above may be executed. Alternatively, the CPU 401 can be configured to perform the process 200 in any other appropriate manner (for example, by means of firmware) in other embodiments.

Those skilled in the art would understand that various steps of the method of the disclosure may be implemented via a general purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that, although several means or sub-means (e.g., specialized circuits) of the device have been mentioned in detailed description above, such partition is only an example, without limitation. Actually, according to the embodiments of the present disclosure, features and functions of two or more devices described above may be instantiated in one device. In turn, features and functions of one device described above may be further partitioned to be instantiated by various devices.

The above-mentioned are only some optional embodiments of the present disclosure and are not limiting the present disclosure. For those skilled in the art, the present disclosure may have various alterations and changes. Any modifications, equivalents and improvements made within the spirit and principle of the present disclosure should be included within the scope of the present disclosure.

We claim:

1. A method of processing metadata, comprising:
   in response to receiving a first modification transaction for metadata on a computing device, acquiring information related to a first busyness degree of the computing device;
   performing a first determination operation that determines whether the first busyness degree is greater than a threshold degree; and
   according to at least the first determination that the first busyness degree is greater than the threshold degree, modifying first metadata in a metadata storage apparatus of the computing device directly without generating a first log related to the first modification transaction in a log storage apparatus of the computing device;
   wherein modifying the first metadata comprises:
      acquiring a first modification record of the first metadata which indicates whether there is a further modification transaction for the first metadata having not been completed; and
      according to a first determination that the first modification record indicates that there is no further modification transaction having not been completed, modifying the first metadata directly without generating the first log.

2. The method of claim 1, further comprising, for a second modification transaction for second metadata:
   according to a second determination that a second busyness degree is less than the threshold degree,
      generating a second log related to the second modification transaction in the log storage apparatus; and
      modifying the second metadata in the metadata storage apparatus.

3. The method of claim 1, further comprising, for a second modification transaction for second metadata:
   acquiring a second modification record of the second metadata which indicates whether there is a further modification transaction for the second metadata having not been completed;
   according to a second determination that the second modification record indicates that there is a further modification transaction having not been completed,
      generating a second log related to the second modification transaction in the log storage apparatus; and
      modifying the second metadata in the metadata storage apparatus.

4. The method of claim 3, further comprising:
   determining an execution state of the first modification transaction; and
   updating, based on the execution state, the first modification record of the first metadata.

5. The method of claim 1, wherein acquiring the information related to the first busyness degree of the computing device comprises:
   acquiring information indicating an occupancy state of storage resources of the log storage apparatus.

6. The method of claim 1, further comprising:
   in response to receiving a second modification transaction for metadata on the computing device, acquiring information related to a second busyness degree of the computing device;
   performing a second determination operation that determines whether the second busyness degree is greater than the threshold degree; and
   according to at least the second determination that the second busyness degree is not greater than the threshold degree, generating a log related to the second modification transaction in the log storage apparatus of the computing device and, after generating the log in the log storage apparatus, modifying second metadata in the metadata storage apparatus of the computing device.

7. The method of claim 6 wherein the first metadata in the metadata storage apparatus is modified by a host;
   wherein the second metadata in the metadata storage apparatus is modified by a process that is different from the host; and
   wherein the method further comprises:
      after the first metadata is modified in the metadata storage apparatus, modifying, by the host, the first metadata in another metadata storage apparatus, and after the second metadata is modified in the metadata storage apparatus, modifying, by a backend program, the second metadata in the other metadata storage apparatus.

8. An electronic device, comprising:
a processor; and
memory coupled to the processor and having instructions stored therein, the instructions, when executed by the processor, causing the device to perform acts comprising:
in response to receiving a first modification transaction for metadata on a computing device, acquiring information related to a first busyness degree of the computing device;
performing a first determination operation that determines whether the first busyness degree is greater than a threshold degree; and
according to at least the first determination that the first busyness degree is greater than the threshold degree, modifying first metadata in a metadata storage apparatus of the computing device directly without generating a first log related to the first modification transaction in a log storage apparatus of the computing device;
wherein modifying the first metadata comprises:
acquiring a first modification record of the first metadata which indicates whether there is a further modification transaction for the first metadata having not been completed; and
according to a first determination that the first modification record indicates that there is no further modification transaction having not been completed, modifying the first metadata directly without generating the first log.

9. The device of claim 8, the acts further comprising, for a second modification transaction for second metadata:
according to a second determination that a second busyness degree is less than the threshold degree,
generating a second log related to the second modification transaction in the log storage apparatus; and
modifying second metadata in the metadata storage apparatus.

10. The device of claim 8, the acts further comprising, for a second modification transaction for second metadata:
acquiring a second modification record of the second metadata which indicates whether there is a further modification transaction for the second metadata having not been completed;
according to a second determination that the second modification record indicates that there is a further modification transaction having not been completed, generating a second log related to the second modification transaction in the log storage apparatus; and
modifying the second metadata in the metadata storage apparatus.

11. The device of claim 10, the acts further comprising:
determining an execution state of the first modification transaction; and
updating, based on the execution state, the first modification record of the first metadata.

12. The device of claim 8, wherein acquiring the information related to the first busyness degree of the computing device comprises:
acquiring information indicating an occupancy state of storage resources of the log storage apparatus.

13. The device of claim 8, the acts further comprising:
in response to receiving a second modification transaction for metadata on the computing device, acquiring information related to a second busyness degree of the computing device;
performing a second determination operation that determines whether the second busyness degree is greater than the threshold degree; and
according to at least the second determination that the second busyness degree is not greater than the threshold degree, generating a log related to the second modification transaction in the log storage apparatus of the computing device and, after generating the log in the log storage apparatus, modifying second metadata in the metadata storage apparatus of the computing device.

14. The device of claim 13 wherein the first metadata in the metadata storage apparatus is modified by a host;
wherein the second metadata in the metadata storage apparatus is modified by a process that is different from the host; and
wherein the acts further comprise:
after the first metadata is modified in the metadata storage apparatus, modifying, by the host, the first metadata in another metadata storage apparatus, and
after the second metadata is modified in the metadata storage apparatus, modifying, by a backend program, the second metadata in the other metadata storage apparatus.

15. A computer program product tangibly stored on a non-transitory computer-readable medium and comprising computer-executable instructions, the computer-executable instructions when executed causing a device to:
in response to receiving a first modification transaction for metadata on a computing device, acquire information related to first busyness degree of the computing device; and
according to at least the first determination that the first busyness degree is greater than the threshold degree, modify first metadata in a metadata storage apparatus of the computing device directly without generating a first log related to the first modification transaction in a log storage apparatus of the computing device;
wherein the computer-executable instructions, when executed to cause the device to modify the first metadata, causes the device to:
acquire a first modification record of the first metadata which indicates whether there is a further modification transaction for the first metadata having not been completed; and
according to a first determination that the first modification record indicates that there is no further modification transaction having not been completed, modify the first metadata directly without generating the first log.

16. The computer program product of claim 15, wherein the computer-executable instructions when executed further cause the device to, for a second modification transaction for second metadata:
according to a determination that a second busyness degree is less than the threshold degree,
generate a second log related to the second modification transaction in the log storage apparatus; and
modify the second metadata in the metadata storage apparatus.

17. The computer program product of claim 15, wherein the computer-executable instructions when executed further cause the device to, for a second modification transaction for second metadata:

acquire a second modification record of the second metadata which indicates whether there is a further modification transaction for the second metadata having not been completed;

according to a second determination that the second modification record indicates that there is a further modification transaction having not been completed, generate a second log related to the second modification transaction in the log storage apparatus; and modify the second metadata in the metadata storage apparatus.

18. The computer program product of claim 17, wherein the computer-executable instructions when executed further cause the device to:

determine an execution state of the first modification transaction; and update, based on the execution state, the first modification record of the first metadata.

19. The computer program product of claim 15, wherein the computer-executable instructions, when executed to cause the device to acquire the information related to the first busyness degree, causes the device to:

acquire information indicating an occupancy state of storage resources of the log storage apparatus.

20. The computer program product of claim 15, wherein the computer-executable instructions when executed further cause the device to:

in response to receiving a second modification transaction for metadata on the computing device, acquire information related to a second busyness degree of the computing device;

perform a second determination operation that determines whether the second busyness degree is greater than the threshold degree; and according to at least the second determination that the second busyness degree is not greater than the threshold degree, generate a log related to the second modification transaction in the log storage apparatus of the computing device and, after generating the log in the log storage apparatus, modify second metadata in the metadata storage apparatus of the computing device.

* * * * *